United States Patent [19]

Parbhoo

[11] 4,222,344
[45] Sep. 16, 1980

[54] SIZE APPLICATOR

[75] Inventor: Kantilal R. Parbhoo, Reynoldsburg, Ohio

[73] Assignee: Owens-Corning Fiberglas Corporation, Toledo, Ohio

[21] Appl. No.: 939,518

[22] Filed: Sep. 5, 1978

[51] Int. Cl.² .................... B05C 11/00; B05C 1/00; B05C 1/06; C03C 25/02

[52] U.S. Cl. .................... 118/608; 65/3 R; 65/3 C; 65/11 R; 65/12; 118/234; 118/244; 118/258; 118/261

[58] Field of Search ............... 118/234, 608, 244, 258, 118/261; 65/3 R, 3 C, 11 R, 12

[56] References Cited

U.S. PATENT DOCUMENTS

| | | | |
|---|---|---|---|
| 3,498,262 | 3/1970 | Hill et al. | 118/234 |
| 3,951,631 | 4/1976 | Fulk | 118/261 |
| 4,109,610 | 8/1978 | Parbhoo et al. | 118/202 |

Primary Examiner—Richard L. Schilling
Attorney, Agent, or Firm—Ronald C. Hudgens; Philip R. Cloutier; Kenneth H. Wetmore

[57] ABSTRACT

Apparatus for applying a thixotropic gel to fibers comprising a first block, a second block, means for holding the first block and the second block together to form a feed passage for the thixotropic gel, and an applicator roll rotatably mounted at the outlet of the feed passage such that during rotation of the applicator roll, thixotropic gel fed from the feed passage is sheared between the first block and the applicator roll to reduce the viscosity of the thixotropic gel, the applicator roll being spaced from the second block such that during rotation of the applicator roll, the thixotropic gel is not sheared between the second block and the applicator roll.

11 Claims, 5 Drawing Figures

SIZE APPLICATOR

BACKGROUND OF THE INVENTION

The present invention relates to the application of thixotropic gels to fibers and more particularly to apparatus for applying thixotropic gels to glass fibers at forming.

It has been proposed to apply existing coating materials to glass fibers at forming as thixotropic gels. Normal thixotropic gels are gels at ambient conditions under non-shear conditions. When a shear stress of sufficient magnitude is applied to these gels, they take on the viscosity of solutions; when the shear stress is removed, they revert to gel.

When a thixotropic gel is applied to a pad-type applicator by hand and the fibers pulled through the pad, a suitable coating can be produced, but the supply of material on the pad cannot be replenished in the usual manner and no known apparatus is suitable. When a belt-type applicator, as for example that shown in the Brasitigam U.S. Pat. No. 2,873,718, is used for applying the gel to the fibers, an uneven coating is produced with some portion of the fibers being left uncoated. When uncoated portions of the fibers are drawn together to form a strand the strand can break. In addition, gel collects at various points of the equipment and is either carried along with the fibers to the package as globs, or drops to the floor of the surrounding area. Air bubbles are dispersed throughout the gel and are carried to the glass fibers, with the result that whenever the fibers are drawn through an air bubble, the fibers remain uncoated and subsequently break. When an applicator such as shown in the Ewing U.S. Pat. No. 3,244,143 is used, air bubbles are also carried along with the gel to the glass fibers with the result that the fibers remain uncoated and subsequently break. The thixotropic gel applicator as shown in the Hill et al U.S. Pat. No. 3,498,262 has been used to apply gel to glass fibers. However, there can be problems with this type applicator such as, for example, thixotropic gel material which is not applied to the glass strands can be sheared between the applicator roll and the lower portion of the applicator block assembly. This can result in clogging of the size applicator and non-uniform distribution of gel on the applicator roll.

SUMMARY OF THE INVENTION

The present invention comprises apparatus for applying thixotropic gels to fibers comprising a first block, a second block, means for holding the first block and the second block together to form a feed passage for the thixotropic gel, and an applicator roll rotatably mounted at the outlet of the feed passage such that during rotation of the applicator roll, thixotropic gel fed from the feed passage is sheared between the first block and the applicator roll to change the thixotropic gel into liquid form, the aplicator roll being spaced from the second block such that during rotation of the applicator roll, no thixotropic gel is sheared between the second block and the applicator roll.

It is an object of the present invention to provide an applicator for coating fibers with thixotropic gels.

A more specific object of the invention is to provide an applicator for coating glass fibers with thixotropic gels in a glass fiber-forming operation.

Further objects of the invention will become apparent to those skilled in the art to which the invention relates from the following description of the invention as set forth hereinafter in detail and from the accompanying drawings.

DESCRIPTION OF THE PREFERRED EMBODIMENTS

Before explaining the present invention in detail, it is to be understood that the invention is not limited to the details of construction and arrangement of the parts illustrated in the accompanying drawings since the invention is capable of being constructed of various means. Also, it is to be understood that the phraseology employed herein is for the purpose of description and not of limitation.

Figure 1:
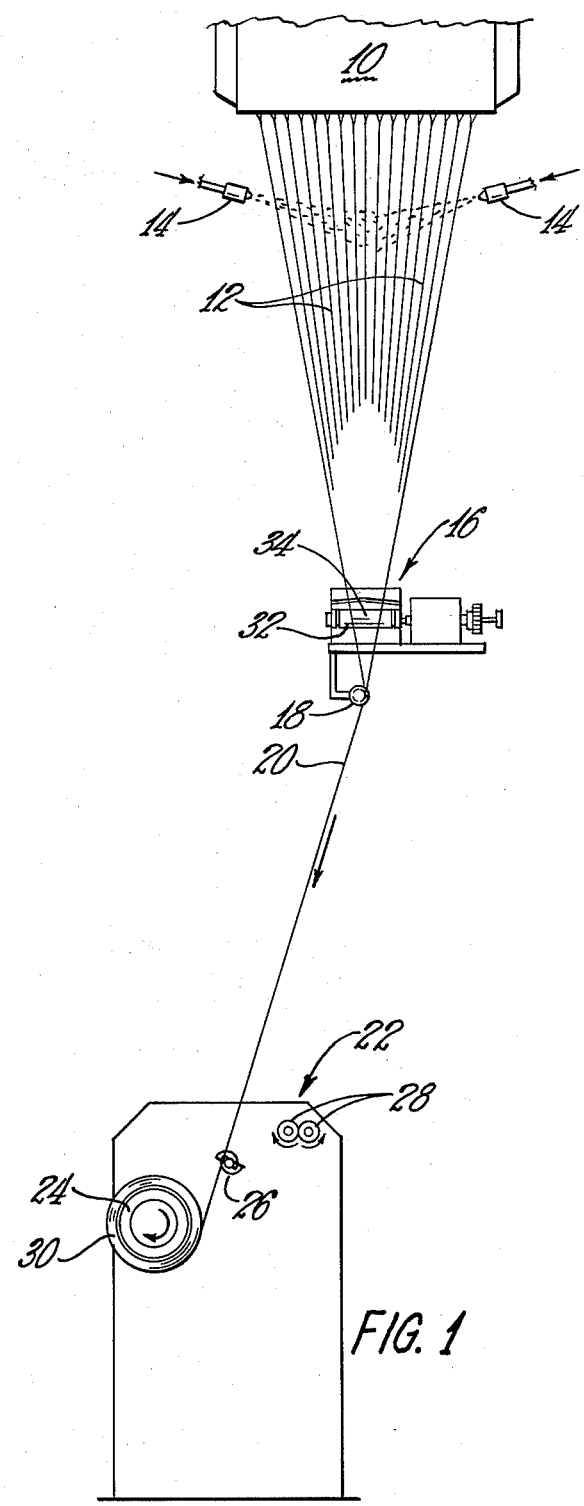
FIG. 1 is a front elevational view of a general layout of a fiber-forming operation in accordance with the present invention.

Referring now more particularly to the drawings, FIG. 1 illustrates a fiber-forming operation. Mineral material, such as glass, is maintained in a molten condition in bushing assembly 10 from which a plurality of streams of material is emitted from the orifices in the bushing for attenuation into fibers 12. Prepad spray nozzles 14 spray water on the newly formed fibers to cool and lubricate the fibers. The fibers are gathered into strand 20 by drawing them over gathering shoe 18 after sizing material has been applied to the fibers by applicator assembly 16. The fiber fan is drawn across a predetermined width of applicator roll 32.

The strand formed of the gathered fibers is packaged by winder apparatus 22. The winder comprises rotatable collet 24 and strand traversing mechanism 26 for distributing the strand lengthwise along the collet during formation of strand package 30. When the strand is not being collected on the rotating collet, the strand can be placed in scrap rolls 28 for attenuation of the strand material.

FIGS. 2-5 show size applicator assembly 16 in greater detail.

Figure 2:
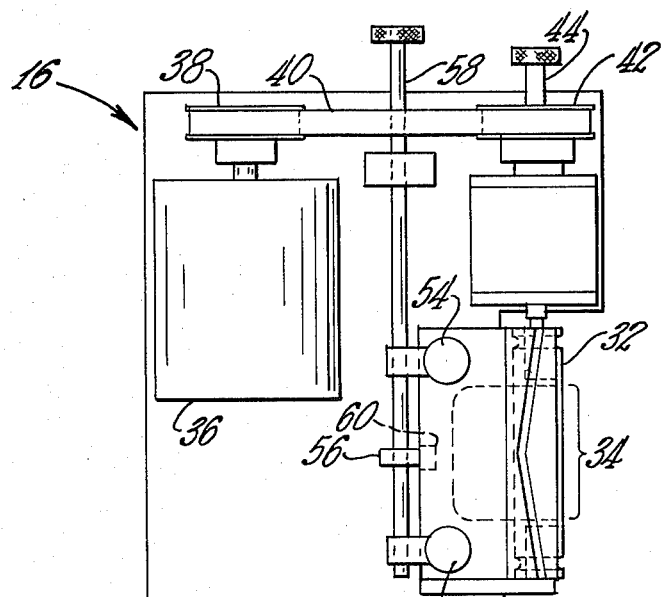
FIG. 2 is a plan view of a size applicator of the present invention.
Figure 3:
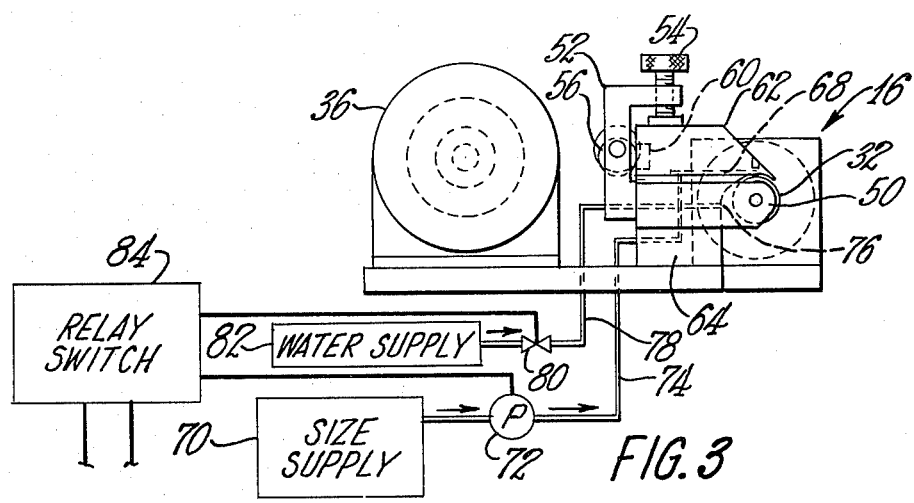
FIG. 3 is an end elevational view of the size applicator shown in FIG. 2 with a schematic illustration of the apparatus for supplying water and size.
Figure 5:
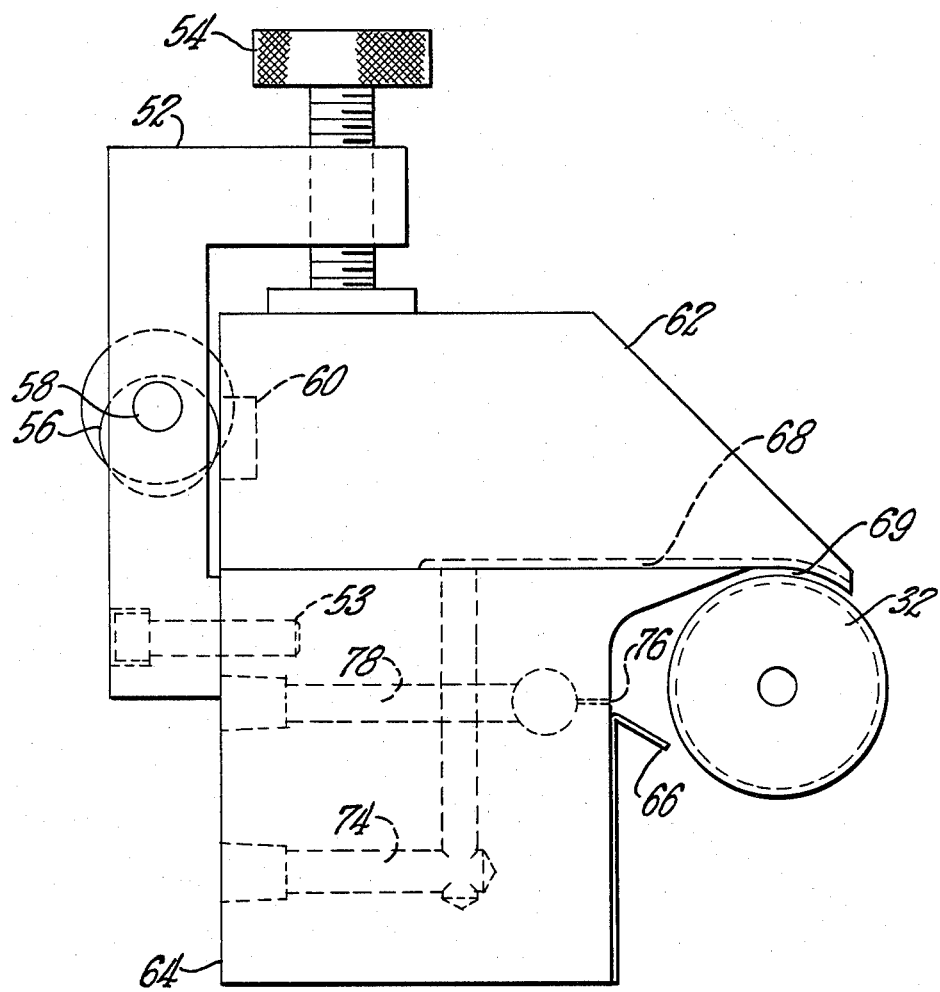
FIG. 5 is an enlarged end elevational view of a portion of the size applicator shown in FIG. 2 with roll support removed.

As shown in FIGS. 2, 3, and 5 a top or first block 62 and a bottom or second block 64 are held together to form feed passage 68 acting as a passageway for the thixotropic gel size. The top block or first portion and the bottom block or second portion form a body defining a feed passage for the size. In the embodiment shown the first block and the second block are removably held adjacent by a supporting means. The supporting means comprises support member 52 which is securely fastened to the second block by screw fastener 53. The support member holds the two blocks together by screw means 54. The two blocks are removably positioned that they can be taken apart for cleaning or other adjustments. To disassemble the blocks, screw means 54 are loosened and cam shaft 58 is rotated to activate cam 56. When activated, the cam pushes against the top block at notch 60 to loosen and separate the top block from the bottom block.

Prepad sprays in a fiber-forming operation can introduce excess water into the size applicator region. To channel this water away from applicator roll 32 inverted, V-shaped notch 63 is provided in the upper surface of the top block. Thus, excess water running down the upper surface of the top block is channeled away from the applicator roll through the notch.

As shown in FIG. 2, the applicator roll is rotatably mounted in the size applicator assembly. Motor 36 drives pulley 38 attached to the motor drive shaft which, in turn, drives belt 40 to rotate pulley 42. Pulley 42 is adapted to rotatably drive the applicator roll.

Figure 4:
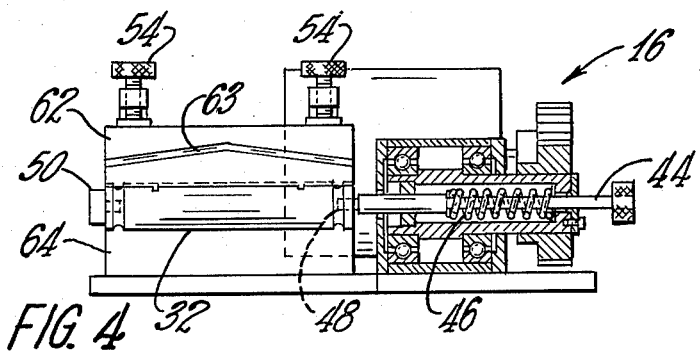
FIG. 4 is a front elevational view of the size applicator of FIG. 2, partially in section.

FIG. 4 illustrates the spring loaded apparatus for removably mounting the applicator roll. One end of the applicator roll is rotatably held by the projection of support 50. The other end of the applicator roll is held by projection 48 at the end of spring loaded shaft 44. The shaft is adapted such that it can be moved axially of the applicator roll by compressing spring 46. When shaft 44 is moved axially away from the applicator roll, projection 48 is removed from the applicator roll so that the applicator roll can be removed from the projection of support 50, and thus, removed from the applicator assembly.

As shown in FIGS. 3 and 5, the applicator assembly comprises means for spraying water on the applicator roll. The water is sprayed from a series of nozzles (one nozzle 76 is shown in FIG. 5). The water travels from water supply 82 through valve means 80 and then through supply line 78 (which passes through the second block) to the nozzle. The water passing through the passage or supply line 78 to the nozzle is effective in controlling the temperature of the second block.

FIG. 5 shows an enlarged view of a portion of the applicator assembly. The applicator roll is mounted at the feed passage or exit end of cavity 68 such that during rotation of the applicator roll, thixotropic gel fed from the feed passage is sheared between the first block and the applicator roll in shearing zone 69 to change the thixotropic gel into liquid form. The applicator roll is spaced from the second block such that during rotation of the applicator roll no thixotropic gel is sheared between the second block and the applicator roll. Air shield 66 is attached to the second block to restrict air from entering between the second block and the applicator roll.

In the embodiment shown, the size or thixotropic gel leaves size supply 70 and moves through the supply line 74 from pump 72. The thixotropic gel is fed from supply line 74 into cavity 68. The thixotropic gel leaves the cavity through the feed passage or exit of the cavity and is fed along a predetermined width of the applicator roll. This width is at least as wide as the fiber fan passing across the applicator roll. It is a preferred embodiment of the invention that the predetermined width of thixotropic gel on the applicator roll is substantially equal to the width of the fiber fan passing across the applicator roll. With this arrangement, there is a minimum waste of thixotropic gel since all of the thixotropic gel on the applicator roll is used to coat the fibers.

The size applicator can be provided with a relay switch 84 as shown in FIG. 3. During times when the strand is being collected on the winder collet, the relay switch energizes pump 72 to pump thixotropic gel to the applicator roll. During times the strand is not being collected on the winder collet, such as when the strand is being attenuated by the scrap rolls or when the fiber forming process is interrupted, the relay switch disengages pump 72 so that the pumping of thixotropic gel to the applicator roll is discontinued. Accordingly, size is being pumped only when fibers are being collected, and thus, minimum size is wasted. The relay also operates valve 80 to control the water being sprayed on the applicator roll. In a preferred embodiment, water is sprayed on the roll only during times that strand is not being collected on the winder collet. Thus, when the strand is being collected on the collet, valve 80 is closed. The water being sprayed on the applicator roll aids in keeping the roll clean.

Various modifications of the above described embodiment of the invention will be apparent to those skilled in the art, and it is to be understood that such modifications can be made without departing from the scope of the invention.

I claim:

1. Apparatus for applying a thixotropic gel to fibers comprising:
   (a) a first block;
   (b) a second block;
   (c) means for holding the first block and the second block together to form a feed passage for the thixotropic gel; and
   (d) an applicator roll rotatably mounted at the outlet of the feed passage such that during rotation of the applicator roll, thixotropic gel feed from the feed passage is sheared between the first block and the applicator roll to reduce the viscosity of the thixotropic gel, the applicator roll being spaced from the second block such that during rotation of the applicator roll, the thixotropic gel on the applicator roll does not contact the second block.

2. The apparatus of claim 1 wherein the thixotropic gel from the feed passage is fed along a predetermined width of the applicator roll, the predetermined width being substantially equal to the width along the applicator roll that the fibers pass for having the thixotropic gel applied thereto.

3. The apparatus of claim 2 wherein the thixotropic gel from the feed passage is fed tangentially to the applicator roll.

4. The apparatus of claim 1 wherein the means for holding the first block and the second block together is a cam means.

5. The apparatus of claim 1 comprising means for spraying water on the applicator roll.

6. The applicator of claim 5 wherein the means for spraying water comprises a nozzle at the second block.

7. The apparatus of claim 6 wherein the second block comprises a supply line for the supply of water to the nozzle, the water in the supply line being effective to control the temperature of the second block.

8. The apparatus of claim 5 comprising control means for regulating the flow of water to the nozzle.

9. The apparatus of claim 1 comprising a spring loadedsupport means for removably supporting the applicator roll.

10. The apparatus of claim 1 comprising control means for regulating the flow of thixotropic gel through the feed passage.

11. The apparatus of claim 1 in combination with a glass fiber forming bushing.

* * * * *